Oct. 25, 1949.  G. E. DUNN  2,485,868
CONSTANT VELOCITY JOINT
Filed Jan. 3, 1944  3 Sheets-Sheet 1

INVENTOR.
George E. Dunn.
BY
Harness, Dickey & Pierce
ATTORNEYS.

Oct. 25, 1949.   G. E. DUNN   2,485,868
CONSTANT VELOCITY JOINT
Filed Jan. 3, 1944   3 Sheets-Sheet 2
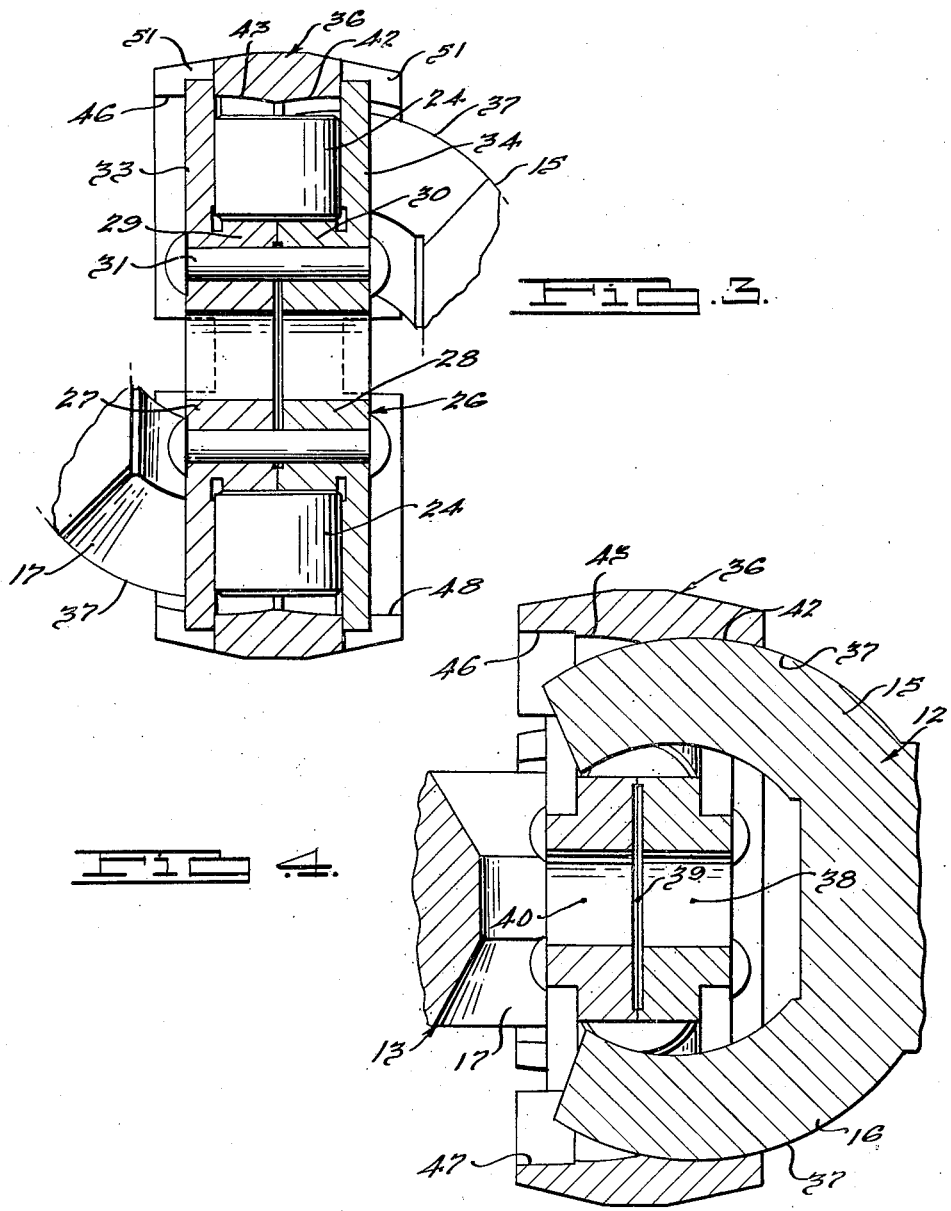
INVENTOR.
George E. Dunn.
BY
Harness, Dickey & Pierce
ATTORNEYS.

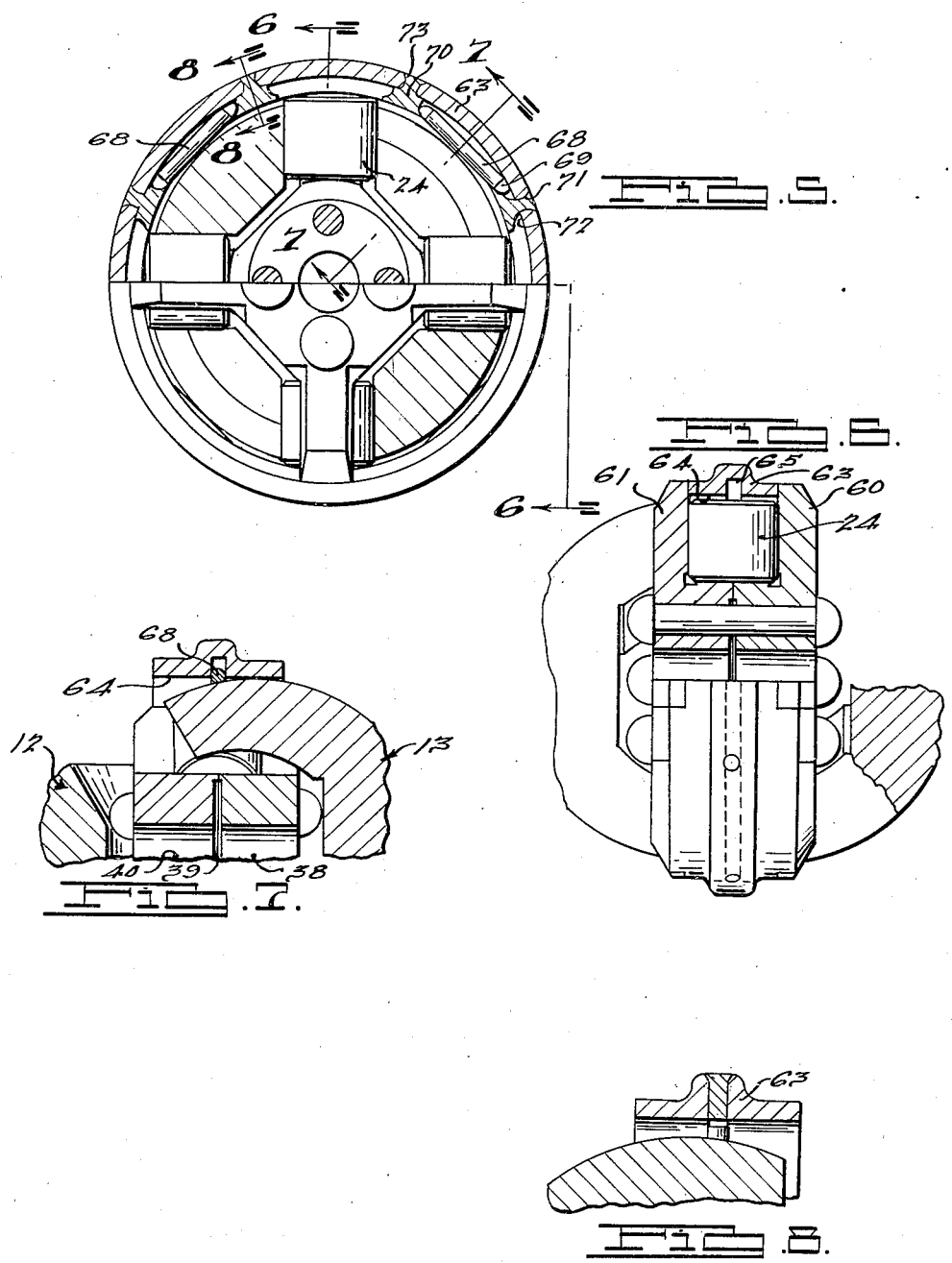

Patented Oct. 25, 1949

2,485,868

UNITED STATES PATENT OFFICE 2,485,868

CONSTANT VELOCITY JOINT

George E. Dunn, Dearborn, Mich., assignor to Universal Products Company, Inc., Dearborn, Mich., a corporation of Delaware Application January 3, 1944, Serial No. 516,757

1 Claim. (Cl. 64—21)

The invention relates to universal joints and it has particular relation to a constant velocity joint.

In certain respects the invention is related to and in other respects it constitutes an improvement over a structure described in the co-pending application for patent filed in the name of Ransom, Serial Number 480,490, filed March 25, 1943, now Patent Number 2,396,750, issued March 19, 1946.

One object of the invention is to provide a constant velocity joint having an improved action using rollers as torque transmitting elements.

Another object of the invention is to provide a universal joint of constant velocity character wherein relatively movable parts that have to be lubricated are located in outer regions so removed from the joint center that lubrication is facilitated.

Another object of the invention is to provide a universal joint of constant velocity character which has relatively few parts easily assembled and held in operative relation.

Other objects of the invention will become apparent from the following description, from the drawings to which it relates and from the claim hereinafter set forth.

For a better understanding of the invention reference may be had to the accompanying drawings wherein:

Figure 3 is a cross-sectional view taken substantially along the line 3—3 of Figure 2;

Figure 4 is a cross-sectional view taken substantially along the line 4—4 of Figure 2;

Figure 5 is a transverse section illustrating a similarly arranged joint constructed according to another form of the invention;

Figure 6 is a cross-sectional view taken substantially along the line 6—6 of Figure 5;

Figure 7 is a cross-sectional view taken substantially along the line 7—7 of Figure 5; and Figure 8 is a cross-sectional view taken substantially along the line 8—8 of Figure 5.

Figure 1:
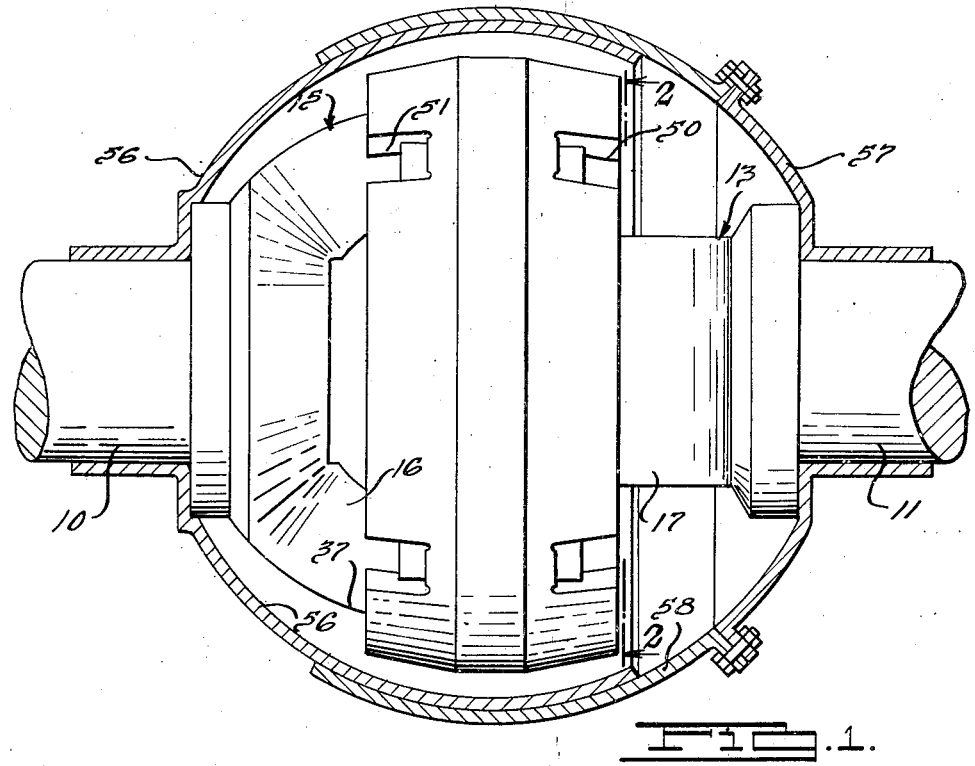
Figure 1 is an elevational view, partly in cross-section of a universal joint constructed according to one form of the invention.
Figure 2:
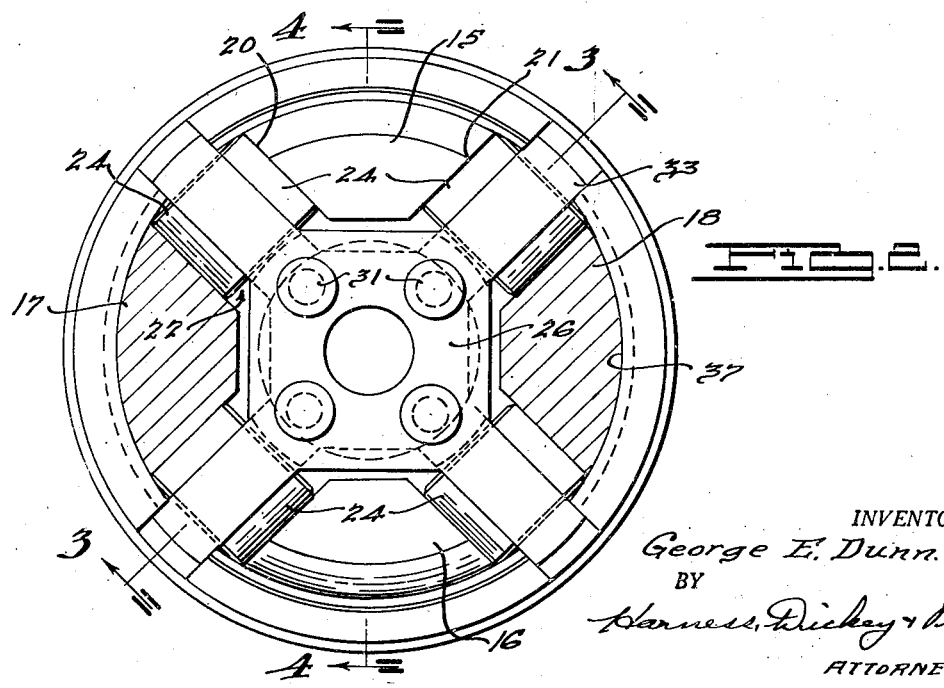
Figure 2 is a cross-sectional view taken substantially along the line 2—2 of Figure 1.

Referring to Figures 1 and 2, shaft elements 10 and 11 are illustrated and these shaft elements respectively are provided with yokes 12 and 13. As best shown by Figure 2, the yoke 12 has diametrically opposed arms 15 and 16 while the yoke 13 has diametrically opposed arms 17 and 18 disposed circumferentially between the arms 15 and 16. Each of the arms has circumferentially opposed edge faces 20 and 21 which extend parallel to the shaft element carrying the arm and each edge face is substantially and circumferentially spaced from the edge face of the adjacent arm on the other shaft element so as to provide an axially directed slot or guideway 22 between each pair of edge faces. A solid roller 24 of cylindrical character is disposed in each slot or guideway for the purpose of providing a movable element adapted to transmit torque from a driving arm to the arm in advance of it. From this it follows that if the arms 15 and 16 are driving arms, and are rotating clockwise as seen in Figure 2, the diametrically aligned rollers at the advance edges of the arms will be torque transmitting members, while the other pair of diametrically aligned rollers will be idle. This condition may reverse or change depending upon which shaft element is being driven and in which direction it is being driven.

With reference now to Figures 2 and 3, the rollers 24 are located in a cage or spider 26 which comprises two parts 27 and 28. These parts respectively have inner-hub portions 29 and 30 connected by rivets 31 and such hub portions are located within or radially inside the arms. At each slot, the two parts 29 and 30 have fingers 33 and 34, respectively, extending outwardly into the slot and closely but slidably fitting opposite sides of the roller therein. Such fingers are substantially narrower in a circumferential direction as compared to the circumferential width of the slot so as to permit angular movement of one pair of yoke arms relative to the other pair without interference on account of the fingers. It is apparent that the spider holds the rollers in a common plane and that the spider and the rollers may be tilted into a shaft angle bisecting plane for obtaining constant velocity.

For moving the spider so as to obtain this constant velocity effect, a ring 36 is provided and this ring is disposed in encircling relation to the external surfaces of all four arms. Each arm has a spherical external surface, as indicated at 37, and with reference to Figure 4 in particular, the center of the spherical surfaces on both arms 15 and 16 is located at 38 in axially spaced relation to the joint center indicated at 39. The outer spherical surfaces 37 on the yoke arms 17 and 18 of yoke 13 have their center at the point 40 disposed at the opposite side of the joint center 39. In other words, the outer spherical surface portions 37 on one yoke form segments of a sphere centered at 38, while the outer spherical surfaces on the other yoke form segments of a sphere center at 40. The two centers 39 and 40 are in alignment with the joint center 39 when the shafts are aligned and are spaced equally from the joint center.

The ring 36 is provided with two annular segments of spherical surfaces 42 and 43 having their centers respectively at the points 38 and 40, and these spherical surface segments fit the spherical surfaces on the arms. With respect to each spherical surface segment on the ring, it may be pointed out that the center 38 or 40, as the case may be, is axially midway between the two side edges of the segment and consequently once the spherical surfaces on the arms of one yoke are in contact with the full spherical surface segment of the ring, the ring and yoke arms are locked against separation in either axial direction, although the yoke may swing within the ring.

In order to permit assembly of the ring and yoke arms, the spherical surface segment 43 is cut away at diametrically opposed locations as indicated at 46 and 47 with the cutaway portions sufficiently long circumferentially to permit the arms 17 and 18 of yoke 13 during assembly to be moved axially through the cutaway portions and into contact with the remaining spherical surface axially inward of the cutaway portions. After doing this, the yoke may be turned through 90°, which moves the yoke arms circumferentially past the cutaway portions 46 and 47 and brings them into surface contact with the entire axial width of the surface segment.

Similarly, the spherical surface segment 42 is cutaway at diametrically opposed locations, one of which is shown at 48 in Fig. 3, to permit initial insertion of the yoke arms 15 and 16 and then swinging of such arms past the cutaway portions into contact with the full width of the spherical segment surface 42. It should be observed that the cutaway portions of surface 43 are located in ninety-degrees spaced relation to the cutaway portions on surface 42, or in other words, the cutaway portions at one side of the ring are axially aligned with the full surface portions at the other side of the ring.

The spider is locked to the ring 36 by providing notches 50 and 51 in opposite edges of the ring into which the fingers 33 on the two parts of the spider project. Hence, the spider and ring move as a unit although the rollers are free to move circumferentially with respect to each other and with respect to the spider and ring. In assembling the joint generally, the two parts of the spider are placed within the yokes with the rollers generally in position between the fingers but with the fingers out of engagement with the notches 50 and 51. Then, two yokes are assembled with the ring in the manner previously stated, assuming, of course, that the spider is turned with respect to the ring so as to allow the yoke arms to move through the cutaway portions. As the yoke arms are initially inserted in this manner, they and the rollers and spider parts are turned until the parts are in proper circumferential relation, after which the two parts of the spider are riveted together.

In order to define the joint center at 39, indicated previously, the shaft elements 10 and 11 may have spherical housing parts 56 and 57 jointly forming a spherical housing with one part resting within the other. The housing part 57 may have a second section indicated at 58 to permit assembly. The mating spherical surfaces of the two housing parts, sliding one on the other, are centered at the point 39 and thus the center of the joint is substantially fixed. Any angular movement of either shaft element occurs through swinging of the element about the joint center. It may be added that the spherical housing parts 56, 57 and 58, either through resiliency or slight axial movement thereof, relatively, or through axial movement of either part 56, 57 on its shaft, will allow any slight axial movement of the yokes axially towards or away from each other as may be required during any angular movement of one shaft with respect to the other. Referring to Figure 4, it will be seen that if yoke 12 is tilted upwardly about the joint center 39, the center 38 of the yoke arm surface must swing likewise. Any swinging of either yoke or shaft element thus effects a swinging of the yoke arms and the center of the yoke arm surface about the joint center. It should be evident from the two co-pending applications mentioned that any movement of either yoke about the joint center will cause the ring to shift only half the angular distance and hence the ring, rollers and spider shift into the plane bisecting the angle between shaft elements. This results in constant velocity operation. It may be mentioned further that the ring and spider are free to float circumferentially although the relative movement is limited by engagement of the spider fingers with the yoke arms. Since no torque is transmitted through the fingers, such engagement with the yoke arms has no effect on the operation of the joint.

Referring to the structure shown by Figures 5 to 8, inclusive, the same yokes 12 and 13 are provided and the rollers are identical to those previously described. The spider employed is essentially the same as that previously described and comprises two parts connected by rivets although fingers somewhat different as indicated at 60 and 61 are disposed in the slots or guideways between the yoke arms at opposite sides of the rollers. In this case, instead of providing a ring, such as the ring 36, having spherical surface segments, a ring 63 is provided which has a cylindrical inner surface as indicated at 64. Hence, in this case, the spherical surface on each yoke arm has line contact with the ring with the line of contact extending circumferentially but being variable in location depending upon swinging movement of the yoke. From this, it should be apparent that with the spherical surface segments on one pair of yoke arms centered at 38, as seen in Figure 7, and the spherical surface segments on the other yoke arm centered at the point 40, swinging movement of either yoke about the joint center 39 will effect movement of the ring, spider and rollers into an angle bisecting plane. The joint center may be determined by a spherical housing in the same manner as shown in Figure 1.

In order to facilitate movement of the ring 63 into angle bisecting position, it is provided with an annular groove 65 in its inner surface and in this groove over each arm, a metal pin 68 is provided. Each of the pins has rounded ends, as indicated at 69, and the ends of adjacent pins are seated in a rivet element 70 having concave faces 71 and 72 receiving the rounded ends of the pins. Such rivet elements lie in the grooves and extend through the ring to the outside where securing heads 73 are formed. Each of the pins is disposed in chordal relation to the ring and is so related to a yoke arm that it resiliently opposes movement of the arm, While tangential contact between the cylindrical surfaces and the spherical surfaces is the real governing factor in the shifting of the ring, the resilient pins tend to push the ring ahead of the arms and help to overcome any frictional resistance in the line contact. Furthermore, they relieve the strain on the tangential contact between the ring and arms. The pins are free to flex or bend outwardly into the groove as may be necessary during any swinging of the yoke arms, or, in other words, they resiliently flex and maintain resilient contact with the yoke arms. Also, the pins normally act to hold the yoke arms from axial inward movement although their resiliency permits the swinging movement about the joint center. It may be said, in other words, that the arms have substantially enlarged contact with the ring by providing the resilient pins and that these resilient pins help to initiate shifting of the ring and help to break the frictional resistance to movement along the line contact while still allowing the line contact to govern the degree of movement of the ring.

It is evident from Figure 7 that as the yoke 13 is tilted counter-clockwise about the joint center 39, that the center 38 will likewise move about the joint center 39. The ring, however, will only shift through half the angle of yoke movement for the reason that the cylindrical surface 64 will maintain tangential contact with the arm surfaces on both yokes. In other words, the contact between the surface 64 and the spherical surface on any arm will be at the end of a radius of the arm surface and this will be true of both arms at each slot. It will be evident from the co-pending application for patent of R. B. Ransom, Serial Number 480,490, previously mentioned, and in particular from Figure 20 therein, that when the bisecting member maintains tangential contact with both surfaces, any angular movement of either shaft element will cause the bisecting member to shift through only half the angle of shaft movement. It similarly is clear, that the spherical surfaces in Figure 4 provide an infinite movement of tangential contacts and that these tangential contacts can only be maintained through shifting of the ring through half the shaft angle movement. Also, with respect to Figure 4, it is clear that if the center 38 is shifted as mentioned, the ring shifts about center 40 and the line between centers 40 and 38 swings about center 40 only half the angle center 38 swings about center 39.

In connection with the joint shown by Figures 1 to 4, inclusive, separation axially of the two yoke members is prevented by the end portions of the spherical segments 42 and 43, or, in other words, inward movement of the yokes is prevented by the dropping spherical surfaces adjacent the center line of the ring 36, while axially outward movement of the yoke arms is prevented by the dropping spherical portions adjacent the axial ends of the ring. Under certain circumstances it might be found desirable to provide the dropping spherical contacts for the yoke arms adjacent the center line of the ring 36 but omit the dropping spherical portions at the ends of the ring and provide cylindrical surfaces instead. Stated in another way, the spherical inner half of each of the surfaces 42 and 43 would be retained but the axially outward half of each would become cylindrical. It follows that assembly could be effected in this type of structure in the same way as described in connection with the joint shown by Figures 5 to 8, inclusive. In fact, another way of looking at this modified type of joint is that instead of using the resilient rollers 68 in Figure 7, each yoke surface would contact an inner spherical surface at the inner end of each half of the cylindrical surface 64. Thus, the cylindrical surface 64 would merge into inner spherical surface segments fitting the two yokes.

Although more than one form of the invention has been illustrated and described in detail, it will be apparent to those skilled in the art that various modifications may be made without departing from the scope of the appended claim.

What is claimed is:

A constant velocity joint comprising a pair of shaft elements, a connecting member on each shaft element and having circumferentially separated arms extending longitudinally of the shaft axis, the arms on one member projecting in a direction axially opposite to the arms of the other with the circumferentially opposite edge faces of each arm spaced from the adjacent sides of the adjacent arms so as to provide an axially elongated guideway or slot circumferentially between each pair of arms, a torque transmitting element disposed in each slot and movable along the slot, means for holding the torque transmitting elements in the same plane, and means for shifting said elements into shaft angle bisecting position when either shaft element is angled relative to the other and including a ring externally encircling the arms and having its inner surface defined by circumferentially alternating spherical surface segments with alternating segments centered at two points respectively which are spaced along the ring axis, the arms at the opposite sides of each slot having external spherical surfaces respectively fitting two alternating spherical surfaces of the ring.

GEORGE E. DUNN.

REFERENCES CITED

The following references are of record in the file of this patent:

UNITED STATES PATENTS

| Number | Name | Date |
| --- | --- | --- |
| 1,968,925 | Barish | Aug. 7, 1934 |
| 2,051,248 | Dunn | Aug. 18, 1936 |

FOREIGN PATENTS

| Number | Country | Date |
| --- | --- | --- |
| 565,099 | Germany | 1932 |
| 773,714 | France | 1934 |